United States Patent
Mimoun

(10) Patent No.: US 11,981,250 B2
(45) Date of Patent: May 14, 2024

(54) METHOD FOR CONTROLLING A LIGHTING DEVICE FOR EMITTING A NON-DAZZLING BEAM FOR LIGHTING THE ROAD

(71) Applicant: VALEO VISION, Bobigny (FR)

(72) Inventor: Mickael Mimoun, Bobigny (FR)

(73) Assignee: VALEO VISION, Bobigny (FR)

( * ) Notice: Subject to any disclaimer, the term of this patent is extended or adjusted under 35 U.S.C. 154(b) by 218 days.

(21) Appl. No.: 17/282,246

(22) PCT Filed: Sep. 30, 2019

(86) PCT No.: PCT/EP2019/076483
§ 371 (c)(1),
(2) Date: Apr. 1, 2021

(87) PCT Pub. No.: WO2020/070079
PCT Pub. Date: Apr. 9, 2020

(65) Prior Publication Data
US 2021/0354619 A1    Nov. 18, 2021

(30) Foreign Application Priority Data

Oct. 2, 2018 (FR) ...................................... 1859145

(51) Int. Cl.
*B60Q 1/14* (2006.01)
*B60Q 3/10* (2017.01)

(52) U.S. Cl.
CPC ........ *B60Q 1/143* (2013.01); *B60Q 2300/056* (2013.01); *B60Q 2300/112* (2013.01); *B60Q 2300/122* (2013.01); *B60Q 2300/41* (2013.01)

(58) Field of Classification Search
CPC ........ B60Q 1/1423; B60Q 3/10; B60Q 3/208; B60Q 1/0023; B60Q 1/0076; B60Q 1/0094; B60Q 1/06; B60Q 1/2607; B60Q 11/00
See application file for complete search history.

(56) References Cited

U.S. PATENT DOCUMENTS

2008/0130302 A1*  6/2008  Watanabe ............. B60Q 1/085
                                                          362/466
2012/0226411 A1   9/2012  Kuoch et al.
(Continued)

FOREIGN PATENT DOCUMENTS

DE    10 2017 001 505 A1    8/2018
EP         2 562 039 A2     2/2013
(Continued)

OTHER PUBLICATIONS

International Search Report dated Jan. 22, 2020 in PCT/EP2019/076483 filed on Sep. 30, 2019, 3 pages.

*Primary Examiner* — Wei (Victor) Y Chan
(74) *Attorney, Agent, or Firm* — Oblon, McClelland, Maier & Neustadt, L.L.P.

(57) ABSTRACT

A method for controlling a lighting device of a host motor vehicle in order to emit a beam for lighting the road that is non-dazzling to a target object on this road. The method includes acquiring, with a sensor system of the host motor vehicle, the position ($x_{target\_t0}$, $y_{target\_t0}$) of the target object on the road at a given time (t0), and predicting, with a predicting unit, the position (xtarget_t1, ytarget_t1) of the target object on the road at a time (t1) that is in the future with respect to the given time. Also included is correcting, with the predicting unit, the acquired position of the target object at a given time depending on the predicted position at the future time, and generating, with the lighting device, a (Continued)

non-dazzling zone (Z) in a beam for lighting the road, which beam the device emits depending on the corrected position ($P_G$, $P_D$) of the target object.

17 Claims, 5 Drawing Sheets

(56) References Cited

U.S. PATENT DOCUMENTS

| | | | |
|---|---|---|---|
| 2013/0049587 A1 | 2/2013 | Nakadate | |
| 2013/0058116 A1 | 3/2013 | Galbas et al. | |
| 2016/0318490 A1* | 11/2016 | Ben Shalom | B60W 30/18154 |
| 2017/0083774 A1 | 3/2017 | Solar et al. | |
| 2019/0143884 A1* | 5/2019 | Yokoyama | B60Q 1/143 |
| | | | 315/79 |
| 2019/0311206 A1 | 10/2019 | Solar et al. | |
| 2019/0344702 A1* | 11/2019 | Breuer | G01B 11/026 |
| 2020/0271786 A1* | 8/2020 | Mano | G01S 17/89 |

FOREIGN PATENT DOCUMENTS

| | | |
|---|---|---|
| EP | 2 957 462 A1 | 12/2015 |
| EP | 3 018 007 A2 | 5/2016 |
| FR | 2 947 223 A1 | 12/2010 |

* cited by examiner

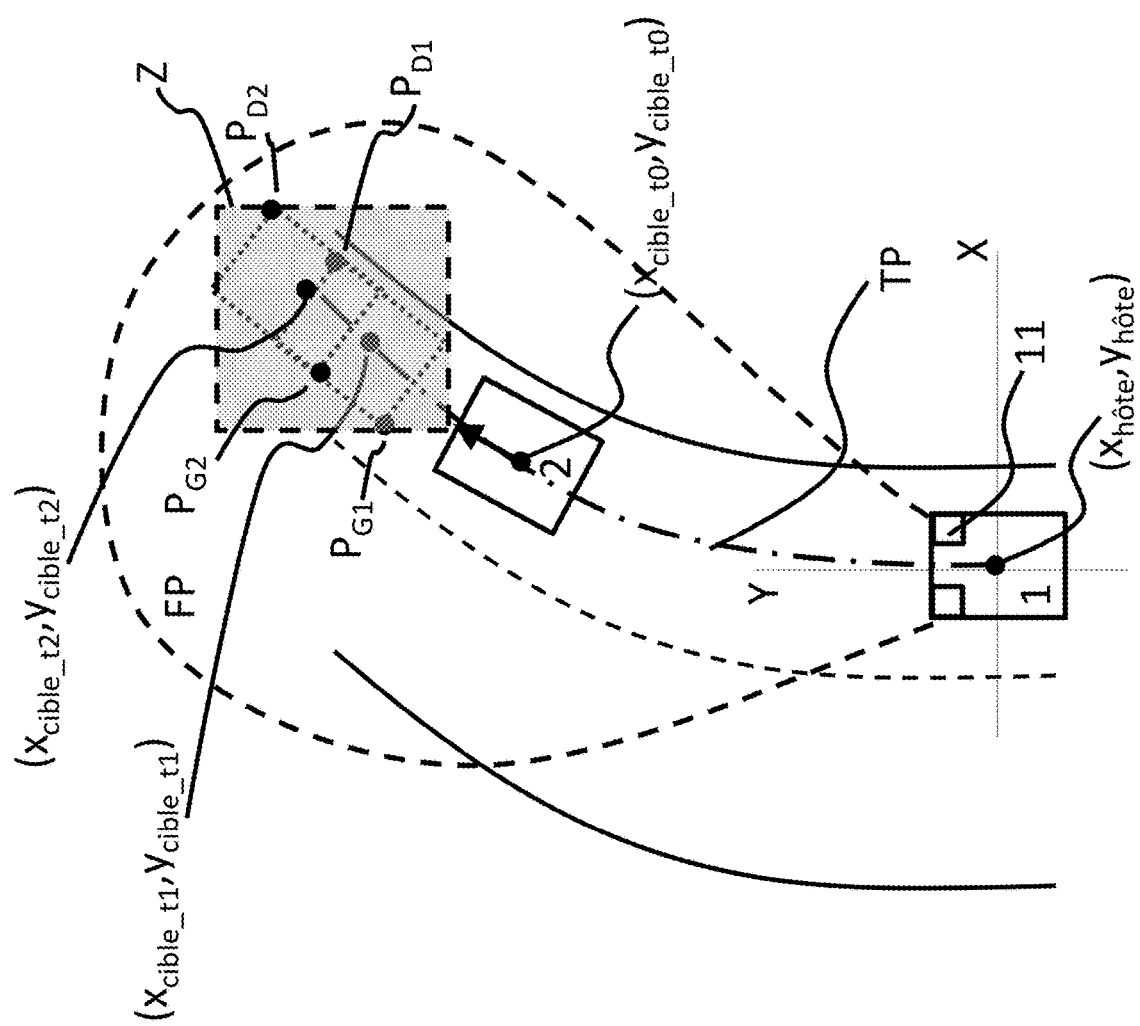

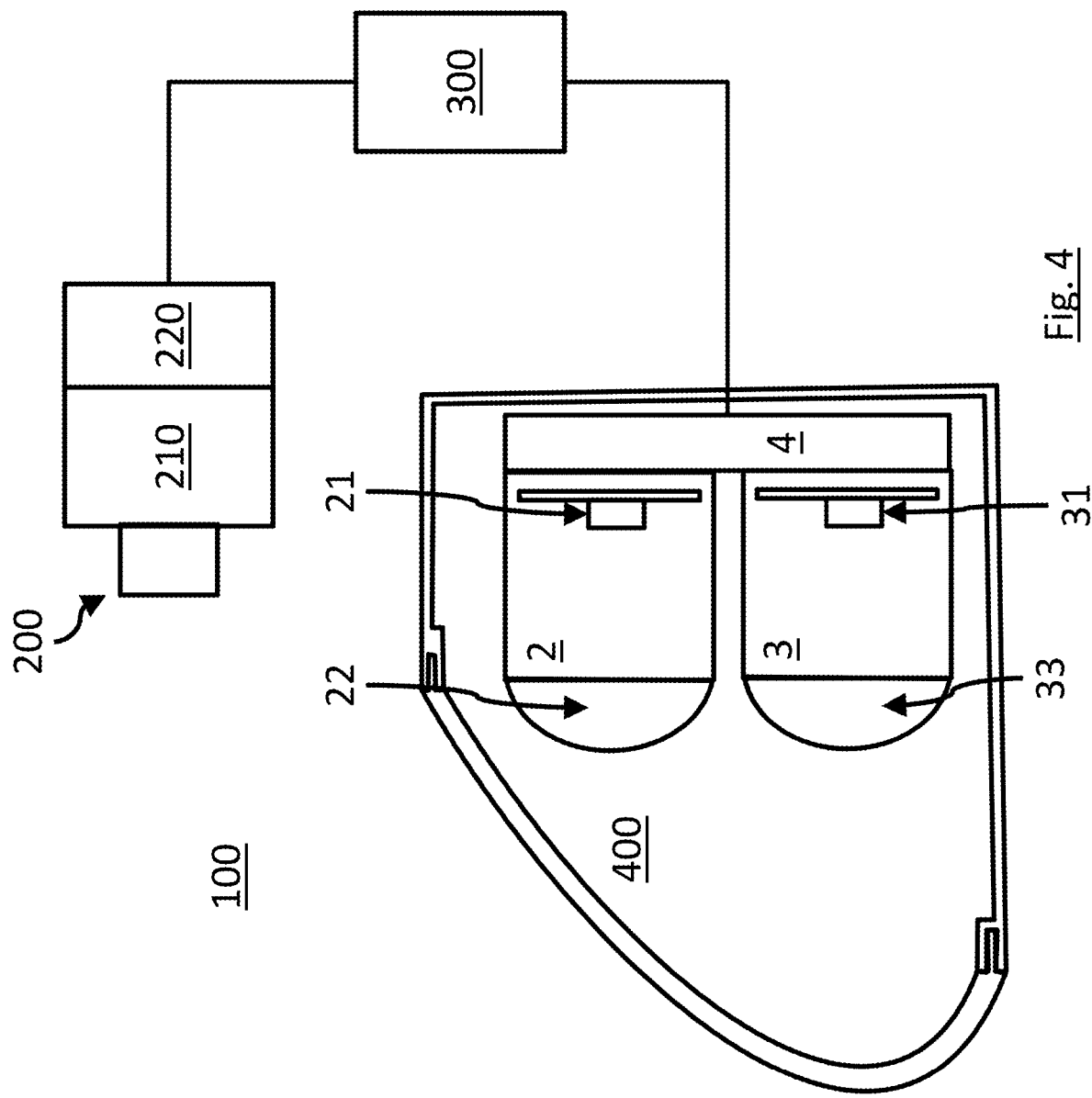

METHOD FOR CONTROLLING A LIGHTING DEVICE FOR EMITTING A NON-DAZZLING BEAM FOR LIGHTING THE ROAD

The invention relates to the field of the lighting of motor vehicles. More particularly, the invention relates to a method for commanding a lighting device of a host motor vehicle to emit a road-illuminating beam that illuminates the road but that does not cause glare to a target object on this road.

It is known practice to equip motor vehicles with lighting systems provided with:
- a sensor system for detecting, on the road, a target object to which glare is not to be caused, and for measuring the position of this object, and
- a lighting system for emitting, depending on the position of this object, a beam that does not cause glare.

To this end, these headlamps are for example capable of emitting a pixelated road-illuminating beam and are provided with a control unit capable of switching on and/or switching off and/or modifying the light intensity of each of the pixels of the beam. Where appropriate, the control unit thus allows, in the centered beam, a region that does not cause glare to be generated by switching off pixels in a region centered on the position of the target object to which glare is not to be caused. Such lighting systems are thus able to optimally illuminate the road, without causing glare to other road users.

In this type of system, the position of the object to which glare is not to be caused is a position that is returned by the sensor system and that is obtained by sampling the real position of this object on the road over time.

Thus, the region that does not cause glare generated in the beam is defined depending on a target-object position that is not real but that is acquired at a given time by the sensor system.

However, the lighting system necessarily exhibits a data-processing, or latency, time between the time at which the sensor system acquires the target-object position and the time at which the headlamp generates the road-illuminating beam that does not cause glare. This processing time may be particularly lengthy compared with driving situations in which the target object is moving at a very high rate, for example when a vehicle is being followed on a road at high speed, or round a bend of high radius of curvature. As a result, the region that must not cause glare in an acquired position of the target object becomes offset with respect to the actual position of this target object, the illuminating beam therefore possibly causing glare.

The objective of the invention is to mitigate this problem and more precisely to provide a solution allowing, in an illuminating beam, a region that does not cause glare to a target object to which glare is not to be caused to be generated, when the target object is moving at a high rate.

To this end, the invention provides a method for commanding a lighting device of a host motor vehicle to emit a road-illuminating beam that illuminates the road but that does not cause glare to a target object on this road; the method comprising the following steps:
- acquiring, by means of a sensor system of the host motor vehicle, the position of the target object on the road at a given time;
- predicting, by means of a predicting unit, the position of the target object on the road at a time that is in the future with respect to the given time;
- correcting, by means of the predicting unit, the target-object position acquired at a given time depending on the predicted position at the future time;
- generating, by means of the lighting device, in a beam for illuminating the road that said device emits, a region that does not cause glare, depending on the corrected position of the target object.

Thus, by virtue of the invention, when the target object to which glare is not to be caused is moving at a high rate, for example because it is moving at high speed or because it is rounding a bend of a high radius of curvature, the region that does not cause glare in the road-illuminating beam is positioned not at the position determined therefor at the time of acquisition of the image of the road, but at a corrected position depending on a prediction of its position at a subsequent time, corresponding to the time at which said road-illuminating beam is emitted with the region that does not cause glare. Thus, the time taken to process the image of the road and the time taken to control the headlamp so as to generate the region that does not cause glare are compensated for, so as not to cause glare to the target object.

Advantageously, the step of generating, in the road-illuminating beam, the region that does not cause glare is therefore carried out at said future time.

According to one embodiment of the invention, the acquiring step comprises a first sub-step of detecting the target object, and a second sub-step of acquiring the position and the type of the target object. By "type of the target object" what is meant is a category of object likely to be present on the road, namely a pedestrian, a bicycle or a motor vehicle.

Advantageously, the acquiring second sub-step makes it possible to identify whether the target object is traveling in an identical or different lane to the lane in which the host vehicle is traveling and/or whether the target object is traveling in the same direction as or in a direction opposite to the direction of in which the host vehicle is traveling.

Advantageously, the detecting sub-step comprises detecting the outline of the target object. Where appropriate, the acquiring sub-step comprises determining the centroid of this outline, the position of the centroid being considered to be the target-object position at the given time. The type of the target object may especially be determined by comparing the outline of the target object to a family of predetermined outlines.

As a variant, the detecting sub-step comprises a detecting light sources belonging to the target object. Where appropriate, the acquiring sub-step comprises determining the centroid of the position of these light sources. The type of the target object may especially be determined by comparing the number of light sources and the position of these light sources to a family of predetermined types of light sources.

Furthermore, the acquiring step may comprise a sub-step of acquiring the speed of the target object, by differentiating its position over time.

Advantageously, the step of predicting the position of the target object is dependent on the target object being a target motor vehicle traveling in the same direction as the host vehicle and at a speed higher than a threshold speed. For example, the predicting step is only implemented if the target object is a motor vehicle being driven in a fast lane, at more than 80 km/h, and in the same direction as the host vehicle. Thus, implementation of a simple prediction of the path of the target object is facilitated. Specifically, a vehicle being driven under such conditions implies the absence of a hairpin bend or of a succession of short bends, this allowing the path of the vehicle to be modeled in a simpler manner, and therefore more rapidly.

According to one embodiment of the invention, the step of acquiring the target-object position is repeated periodically, within a given acquisition period. It is for example a question of processing (especially employing the sub-steps of detecting and acquiring the position and type of the target object) images acquired by a camera filming the road in order to determine the target-object position, and thus of determining a preset number of positions per second PPS, and especially 30 positions/second.

Where appropriate, the future time of the predicting step, for a given acquisition time, is located after the acquisition time consecutive to this given acquisition time, and especially after the $5^{th}$, or even after the $10^{th}$ acquisition time consecutive to this given acquisition time. Specifically, in the case of movement at a very high rate compared to a low number of images per second and/or a slow processing speed, the target object may, due to the latency induced by the processing time and time taken to generate the region that does not cause glare, have moved detrimentally between the first acquisition time and the time of generation of the region that does not cause glare, which is much greater than the acquisition time. The correction of the acquired position via the prediction of the target-object position at said future time thus allows this movement to be compensated for, without it being necessary to increase the processing speed of the sensor system and lighting-device control unit.

Advantageously, the future time of the predicting step may be offset with respect to the given time of the acquiring step by a computed duration depending on the latency of the acquiring, predicting, correcting and generating steps. In this way, a corrected position is obtained that is substantially similar to the real target-object position at the moment when the region that does not cause glare is generated in the illuminating beam.

According to one embodiment of the invention, the predicting step may comprise a sub-step of modeling a path of the host vehicle. Specifically, it is possible to assume that the target object will move over the road in the same way as the host vehicle. This is especially the case when the target object is a motor vehicle that is being followed by the host vehicle. This hypothesis thus assumes that the followed vehicle was, a few moments before, in the same position as the host vehicle, and that the path of the host vehicle should result in the latter being in the position of the target vehicle a few moments later. Therefore, modeling the path of the host vehicle allows the path of the target vehicle to be modeled, so as to be able to predict its position at a future time.

Where appropriate, the path of the host vehicle may be modeled from its position at the given time of the acquiring step, to the position of the target object acquired in said acquiring step.

Advantageously, said path is modeled by a polynomial $y=f(x)$, x being a coordinate along a steering X-axis of the host vehicle and y a coordinate along a Y-axis normal to the X-axis, the polynomial being a third-degree polynomial the coefficients $c_0$, $c_1$, $c_2$ and $c_3$ of which are determined depending on the curvature of the road, and on the speeds and positions of the host vehicle and target object. This type of polynomial is especially suitable for modeling the path of a motor vehicle, in particular when the latter is driving in a fast lane, i.e. a lane in which the highest rates of movement are observed.

Advantageously, to model the path, the coefficients of the terms of degree 2, 1, 3 and 0 are successively determined.

In one exemplary embodiment of the invention, the coefficient of the term of degree 2 is computed depending on the curvature of the road and on the wheelbase of the host vehicle, it being understood that other parameters may be taken into account in this computation. Where appropriate, the curvature of the road is obtained by means of the angle of the steering wheel of the host vehicle at the acquisition time and of the steering gear ratio (indicating the relationship between the rotation of the steering wheel and the amount by which the steered wheels pivot). For example, the coefficient of the term of degree 2 is computed using the following equation:

$$c_2 = \frac{\text{factor} \times \theta_{volant}}{2 \times E}$$

where factor is the steering gear ratio, $\theta_{volant}$ is the angle applied to the steering wheel of the host vehicle at the acquisition time and E is the wheelbase of the host vehicle.

As a variant, in the case where the host vehicle is equipped with a system capable of determining the speed and yaw of the host vehicle, the coefficient of the term of degree 2 is computed depending on the yaw and speed of the host vehicle. For example, the coefficient of the term of degree 2 is computed using the following equation:

$$c_2 = \frac{\dot{\theta}_{hôte}}{2 \times V_{hôte}}$$

where $\dot{\theta}_{hôte}$ is the derivative of the yaw of the host vehicle at the acquisition time and $V_{hôte}$ is the speed of the host vehicle at the acquisition time.

These equations especially stem from the fact that the coefficient of the term of degree 2 of the polynomial corresponds to the rate of change of the curve of the polynomial and therefore to that of the road.

In one exemplary embodiment of the invention, the coefficient of the term of degree 1 of the third-degree polynomial is zero. This zero coefficient is particularly suitable when the host vehicle is moving collinearly to the road, this especially being the case when the host vehicle is not overtaking, the start of the modeled path thus being linear.

In one exemplary embodiment of the invention, the coefficient of the term of degree 3 is computed depending on the position of the target object, and possibly on the yaw of the target object. Where appropriate, the yaw of the target object is obtained by means of the speeds of the target object and host vehicle, for example by means of the following equation:

$$\text{lacet} = atan\left(\frac{V_Y}{V_X + V_{hôte}}\right)$$

where $V_X$ and $V_Y$ are the speeds along the X- and Y-axes, which are obtained by differentiating the acquired positions of the target object, and $V_{hôte}$ is the speed of the host vehicle, which is for example obtained by means of a navigation system of the host vehicle and which corresponds to the speed along the X-axis (the host vehicle having by definition a speed of zero along the Y-axis).

For example, the coefficient of the term of degree 3 is computed by means of the following equation:

$$c_3 = \frac{a\tan(\text{lacet}) - 2c_2 x_{cible}}{3x_{cible}^2},$$

where lacet is the yaw of the target object at the acquisition time, $c_2$ is the coefficient of the term of degree 2 computed beforehand and $x_{cible}$ is the position of the target object along the X-axis.

This equation especially stems from the fact that, when the target object is not in the process of overtaking, it moves in a direction collinear to the road. Therefore, the yaw of the target object at the acquisition time is equal to the tangent of the derivative of the third-degree polynomial level with the target object at this acquisition time: $f'(x_{cible})=a\tan(\text{lacet})$.

In one exemplary embodiment of the invention, the coefficient of the term of degree 0 of the third-degree polynomial is computed depending on the target-object position. This coefficient of degree 0 corresponds to the lane offset between the host vehicle and the target object. For example, the coefficient of the term of degree 0 is computed by means of the following equation: $c_0 = y_{cible} - c_2 x_{cible}^2 - c_3 x_{cible}^3$, where $x_{cible}$ is the position of the target object along the X-axis and $y_{cible}$ is the position of the target object along the Y-axis.

Advantageously, the predicting step may comprise a sub-step of extrapolating the modeled path up to the future time in order to obtain the predicted target-object position at this future time. Specifically, once the path has been modeled from the position of the host vehicle to the target-object position at the acquisition time, it is possible to extend this modeled path beyond this acquisition time to obtain the position of the target object at said future time. For example, the position of the target object along the X-axis at the future time is estimated using the position and speed of the target object at the acquisition time: $x_{cible\_futur} = x_{cible} + V_{cible} t_{futur}$, and the position of the target object along the Y-axis at the future time is estimated using the third-degree polynomial: $y_{cible\_futur} = c_0 + c_2 x_{cible\_futur}^2 + c_3 x_{cible\_futur}^3$.

Advantageously, the correcting step may consist in replacing the acquired position with the predicted position.

As a variant, the correcting step may comprise replacing the acquired position with a pair of positions corresponding to the positions of the left and right edges of the target object in the predicted position. These positions of the left and right edges may for example be determined using the size of the target object, which is obtained, where appropriate, during the acquiring step.

In one embodiment, the predicting step may comprise a sub-step of extrapolating the modeled path up to a first future time and up to a second future time, in order to obtain first and second predicted positions of the target object at these future times, the first and second future times corresponding to an offset, from the given time, by the minimum and maximum latencies of the acquiring, predicting and correcting steps, respectively.

Where appropriate, the correcting step may comprise replacing the acquired position with a pair of positions, in which:
  one of the positions corresponds to the leftmost position of the positions of the left edges in the first and second predicted positions;
  the other of the positions corresponds to the rightmost position of the positions of the right edges in the first and second predicted positions.

According to one embodiment of the invention, the road-illuminating beam emitted by the lighting device is a pixelated beam. Where appropriate, the step of generating a region that does not cause glare consists of switching on and/or switching off and/or modifying the intensity of a plurality of pixels of this pixelated beam depending on the corrected position.

Advantageously, the step of generating a region that does not cause glare may consist in switching off a plurality of pixels of the pixelated beam to form a dark region around the target object in the corrected position. Where appropriate, the dark region extends between the first and second positions of the pair of positions determined in the correcting step.

Another subject of the invention is a lighting system for a motor vehicle, comprising:
  a sensor system able to acquire the position of a target object on the road at a given time;
  a predicting unit able to predict the position of the target object on the road at a time that is in the future with respect to the given time, and to correct the acquired position depending on the predicted position;
  a lighting device able to emit a road-illuminating beam and to generate, in this beam, a region that does not cause glare, depending on the corrected position of the target object.

The lighting system is advantageously arranged to implement a control method according to the invention.

Preferably, the lighting device is arranged to emit a pixelated beam forming said road-illuminating beam and comprises, to this end, a control unit capable of switching on and/or switching off and/or modifying the light intensity of each of the pixels of the pixelated beam.

Advantageously, the lighting device may comprise one or more arranged luminous modules, the module or all of the modules together being arranged to emit said pixelated beam.

According to one embodiment, the or each luminous module may be arranged so that the pixelated beam contains at least 400 pixels, or even at least 1000 pixels, or even at least 2000 pixels. This pixelated beam may for example comprise 20 columns and 20 rows of pixels, and especially 32 columns and 32 rows of pixels.

Advantageously, the module may be arranged so that each pixel of the pixelated beam has a width and/or a length smaller than 1°, especially smaller than 0.5°, or even smaller than 0.3°.

Also advantageously, the luminous module may be arranged so that the pixelated beam has a vertical amplitude of at least 5°, and especially of at least 9°, and a horizontal amplitude of at least 5°, and especially of at least 12°.

The luminous module may for example comprise:
  a pixelated light source comprising a plurality of elementary emitters arranged in a matrix array, each of the elementary emitters being able to be activated selectively so as to emit one elementary light beam; and
  a projecting optical element associated with said pixelated light source, for projecting each of said elementary light beams in the form of one pixel, all the pixels together forming said pixelated beam.

Advantageously, the projecting optical element is arranged such that the pixelated beam has a vertical amplitude of at least 5° and a horizontal amplitude of at least 5°. These horizontal and vertical amplitudes make it possible to ensure that the pixelated beam is projected onto a sufficiently large area of the road to perform lighting functions of the glare-free road-illuminating type. The projecting optical element may thus comprise one or a combination of a plurality of the following optical components: lens, reflector, guide, collimator, prism.

Where appropriate, the pixelated light source may comprise at least 20 columns and at least 20 rows of elementary emitters, and especially at least 32 rows and columns of elementary emitters. These minimum numbers of columns and rows of elementary emitters, in combination with the aforementioned vertical and horizontal amplitudes, allow, for each of the elementary light beams, once they have been projected by the projecting optical element, an angular aperture smaller than 0.5°, or even smaller than 0.3°, to be obtained. In this way, the resolution of the pixelated beam when it is projected onto the road is minimized such as to guarantee an optimal definition of the region that does not cause glare, and hence the illumination of the road is maximized without causing glare to the target object.

Advantageously, the elementary emitters and the projecting optical element are arranged so that two neighboring pixels, i.e. two pixels that are adjacent on the same row or in the same column, are contiguous, i.e. their adjacent edges are coincident.

In one embodiment of the invention, the pixelated light source of the first module comprises at least one matrix array of at least two columns and at least two rows of electroluminescent elements (i.e. what is called a monolithic array). Preferably, the electroluminescent source comprises at least one monolithic matrix array.

In a monolithic matrix array, the electroluminescent elements are grown from a common substrate and are electrically connected so as to be able to be activated selectively, individually or by subset of electroluminescent elements. Each electroluminescent element or group of electroluminescent elements (which may emit light when its or their material is supplied with electricity) may form one of the elementary emitters of said pixelated light source.

Various arrangements of electroluminescent elements may meet this definition of a monolithic matrix array, provided that the electroluminescent elements have one of their main dimensions of elongation substantially perpendicular to a common substrate and that the spacing between the elementary emitters, which are formed by one or more electroluminescent elements that are electrically grouped together, is small in comparison with the spacings found in known arrangements of flat square chips soldered to a printed circuit board.

The substrate may be made mainly of semiconductive material. The substrate may comprise one or more other materials, non-semiconductive for example.

These electroluminescent elements, which are of submillimeter dimensions, are for example arranged so as to protrude from the substrate so as to form rods of hexagonal cross section. The electroluminescent rods originate on a first face of a substrate. Each electroluminescent rod, here formed using gallium nitride (GaN), extends perpendicular, or substantially perpendicular, to, and thereby protrudes from, the substrate, which here is made of silicon, though other materials, such as silicon carbide, may be used without departing from the context of the invention. By way of example, the electroluminescent rods could be made of an alloy of aluminum nitride and of gallium nitride (AlGaN), or of an alloy of aluminum, indium and gallium phosphides (AlInGaP). Each electroluminescent rod extends along an axis of elongation defining its height, the base of each rod being arranged in a plane of the upper face of the substrate.

The electroluminescent rods of a given monolithic matrix array advantageously have the same shape and the same dimensions. They are each bounded by an end face and by a circumferential wall that extends along the axis of elongation of the rod. When the electroluminescent rods are doped and subjected to a bias, the resulting light output from the semiconductor source is mainly emitted from the circumferential wall, though it will be understood that light rays may also exit from the end face. As a result, each electroluminescent rod acts as a single light-emitting diode and the brightness of this source is improved, on the one hand because of the density of the electroluminescent rods present, and on the other hand because of the size of the illuminating area that is defined by the circumferential wall and that therefore extends over the entire perimeter and the entire height of the rod. The height of a rod may be comprised between 2 and 10 μm, and is preferably 8 μm; the largest dimension of the end face of a rod is smaller than 2 μm, and preferably smaller than or equal to 1 μm.

It will be understood that, when forming the electroluminescent rods, their height may not be kept constant from one region of the pixelated light source to the next, so as to increase the brightness of the corresponding region when the average height of the rods therein is increased. Thus, a group of electroluminescent rods may have a height, or heights, that differ from another group of electroluminescent rods, these two groups being constituents of the same semiconductor light source comprising electroluminescent rods of submillimeter dimensions. The shape of the electroluminescent rods, and especially the cross section of the rods and the shape of the end face, may also vary from one monolithic matrix array to another. The rods have a generally cylindrical shape, and they may especially have a polygonal and more particularly hexagonal cross section. It will be understood that it is important, if light is to be able to be emitted through the circumferential wall, for the latter to have a polygonal or circular shape.

Moreover, the end face may have a shape that is substantially planar and perpendicular to the circumferential wall, such that it extends substantially parallel to the upper face of the substrate, or else it may have a shape that is curved or pointed at its center, so as to increase the directions in which the light exiting from this end face is emitted.

The electroluminescent rods are arranged in a two-dimensional matrix array. This arrangement could be such that the rods are staggered. Generally speaking, the rods are arranged at regular intervals on the substrate and the distance separating two immediately adjacent electroluminescent rods, in each of the dimensions of the matrix array, must be at least equal to 2 μm, and preferably comprised between 3 μm and 10 μm, in order that the light emitted through the circumferential wall of each rod may exit from the matrix array of electroluminescent rods. Moreover, provision is made for these separating distances, measured between two axes of elongation of adjacent rods, not to be greater than 100 μm.

According to another embodiment, the monolithic matrix array may comprise electroluminescent elements formed by layers of epitaxial electroluminescent elements, in particular a first layer of n-doped GaN and a second layer of p-doped GaN, on a single substrate, for example made of silicon carbide, and which is sliced (by grinding and/or ablation) to form a plurality of elementary emitters respectively originating from one and the same substrate. The result of such a design is a plurality of electroluminescent blocks all originating from one and the same substrate and electrically connected so as to be able to be activated selectively from one another.

In one exemplary embodiment according to this other embodiment, the substrate of the monolithic matrix array may have a thickness of between 100 µm and 800 µm, in particular equal to 200 µm; each block may have a width and a width, each being between 50 µm and 500 µm, preferably between 100 µm and 200 µm. In one variant, the length and the width are equal. The height of each block is less than 500 µm, preferably less than 300 µm. Finally, the exit surface of each block may be formed via the substrate on the side opposite the epitaxy. The separating distance between two elementary emitters. The distance between each contiguous elementary emitter may be less than 1 µm, in particular less than 500 µm, and is preferably less than 200 µm.

According to another embodiment that is not shown, both with electroluminescent rods extending respectively projecting from one and the same substrate, as described above, and with electroluminescent blocks obtained by slicing electroluminescent layers superimposed on one and the same substrate, the monolithic matrix array may furthermore comprise a layer of a polymer material in which the electroluminescent elements are at least partially embedded. The layer may thus extend over the entire extent of the substrate, or only around a given group of electroluminescent elements. The polymer material, which may in particular be silicone-based, creates a protective layer that allows the electroluminescent elements to be protected without hindering the diffusion of the light rays. Furthermore, it is possible to integrate, into this layer of polymer material, wavelength conversion means, for example luminophores, that are able to absorb at least some of the rays emitted by one of the elements and to convert at least some of said absorbed excitation light into an emission light having a wavelength that is different from that of the excitation light. Provision may be made without distinction for the luminophores to be embedded in the mass of the polymer material, or else to be arranged on the surface of the layer of this polymer material.

The pixelated light source may furthermore comprise a coating of reflective material to deflect the light rays to the exit surfaces of the light source.

The electroluminescent elements of submillimeter dimensions define a given exit surface in a plane substantially parallel to the substrate. It will be understood that the shape of this exit surface is defined depending on the number and the arrangement of the electroluminescent elements that form it. It is thus possible to define a substantially rectangular shape of the emission surface, it being understood that the latter may vary and adopt any shape without departing from the context of the invention.

The one or more monolithic matrix arrays able to emit light rays may be coupled to the control unit. The control unit may be mounted on one or more of the matrix arrays, the assembly thus forming a lighting sub-module. In this case, the control unit may comprise a central processing unit coupled to a memory on which there is stored a computer program that comprises instructions allowing the processor to perform steps that generate signals for controlling the light source. The control unit may be an integrated circuit, for example an ASIC (acronym for "Application-Specific Integrated Circuit") or an ASSP (acronym for "Application-Specific Standard Product").

As a variant, the pixelated light source may be formed by the assembly of at least one light source formed from at least one light-emitting diode and of a matrix array of optoelectronic elements, a digital micromirror device (DMD) for example, that directs the light rays output from said at least one light source by reflection toward the projecting optical element. Where appropriate, a collecting optical element allows the rays from the at least one light source to be collected in order to concentrate them and to direct them toward the surface of the digital micromirror device. Each micromirror is able to pivot between two fixed positions, a first position in which the light rays are reflected toward the projecting optical element, and a second position in which the light rays are reflected away from the projecting optical element. The two fixed positions are oriented in the same way for all of the micromirrors and form, with respect to a support reference plane of the digital micromirror device, an angle characteristic of the digital micromirror device, defined in the specifications thereof. This angle is generally less than 20° and usually has a value of about 12°. Thus, each micro-mirror, which reflects a small part of the light rays incident on the digital micromirror device, forms an elementary emitter of the pixelated light source, the actuation and control of the change in position allowing this elementary emitter to be selectively activated to emit or not emit an elementary light beam. Where appropriate, the control unit is arranged to control the actuation and the change in position of each micromirror.

As another variant, the pixelated light source may be formed by a laser scanning system in which a laser source emits a laser beam toward scanning means that are configured to scan, with the laser beam, the surface of a wavelength-converting element, which surface is imaged by the projecting optical element. The beam is scanned by the scanning means at a speed that is high enough for the human eye to be unable to perceive its movement in the projected image. Synchronized control of the switch-on of the laser source and of the scanning motion of the beam allows a matrix array of selectively activatable, elementary emitters to be generated on the surface of the wavelength-converting element. Where appropriate, the control unit is arranged to synchronously control the switch-on of the laser source and the scanning motion of the beam. Here, the scanning means are a moveable micromirror, allowing the surface of the wavelength-converting element to be scanned by reflection of the laser beam. The micromirrors mentioned by way of scanning means are, for example, MEMS (microelectromechanical systems). However, the invention is in no way limited to this scanning means, and may use other types of scanning means, such as a series of mirrors arranged on a rotary element, the rotation of the element causing the transmission surface to be scanned by the laser beam.

Another subject of the invention is a data-storage means, this storage means storing one or more programs the execution of which allows the method according to the invention to be implemented. Where appropriate, the data-storage means comprises a volatile memory and/or a non-volatile memory and/or a hard disk and/or a floppy disk and/or a CD-ROM.

Yet another subject of the invention is a computer program on a data-storage means, comprising one or more sequences of instructions that are executable by a microprocessor and/or a computer, the execution of said sequences of instructions permitting the method according to the invention to be implemented.

Other features and advantages of the present invention will be better understood from the description of examples, and from the drawings, in which:

FIGS. 2A and 2B show one example of a method for commanding a lighting device according to the invention;

FIG. 4 shows one example of a lighting system implementing the method of FIG. 2B.

Unless specified otherwise, technical features that are described in detail for one given embodiment may be combined with the technical features that are described in the context of other embodiments described by way of example and non-limitingly.

Figure 1B:
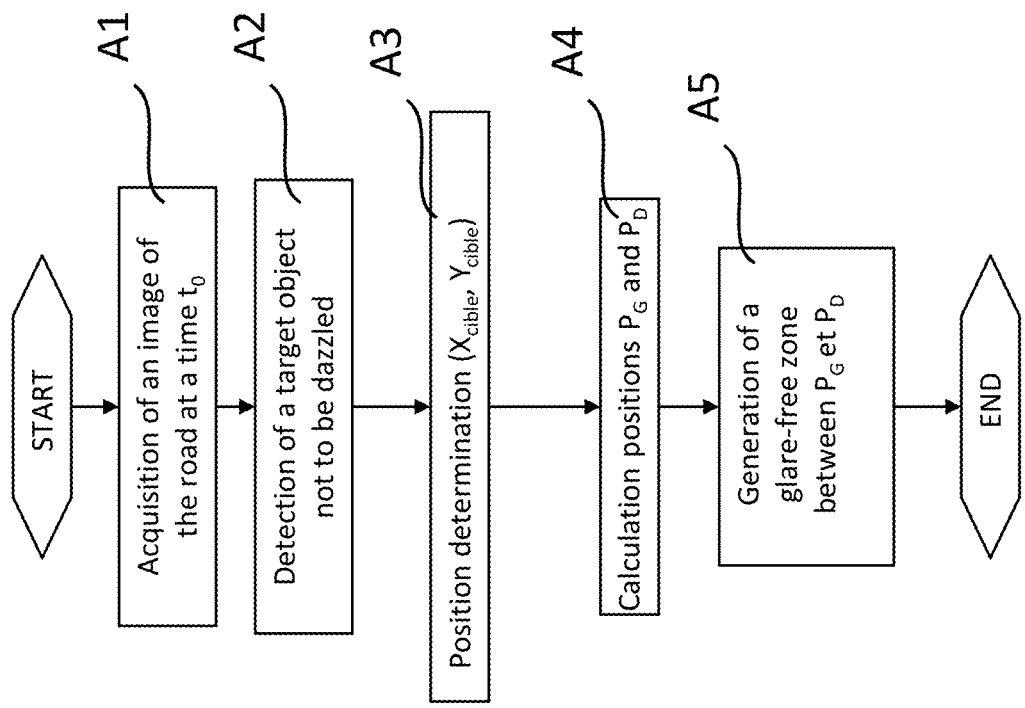
FIGS. 1A and 1B show one example of a method for commanding a lighting device such as known in the prior art.
Figure 1A:
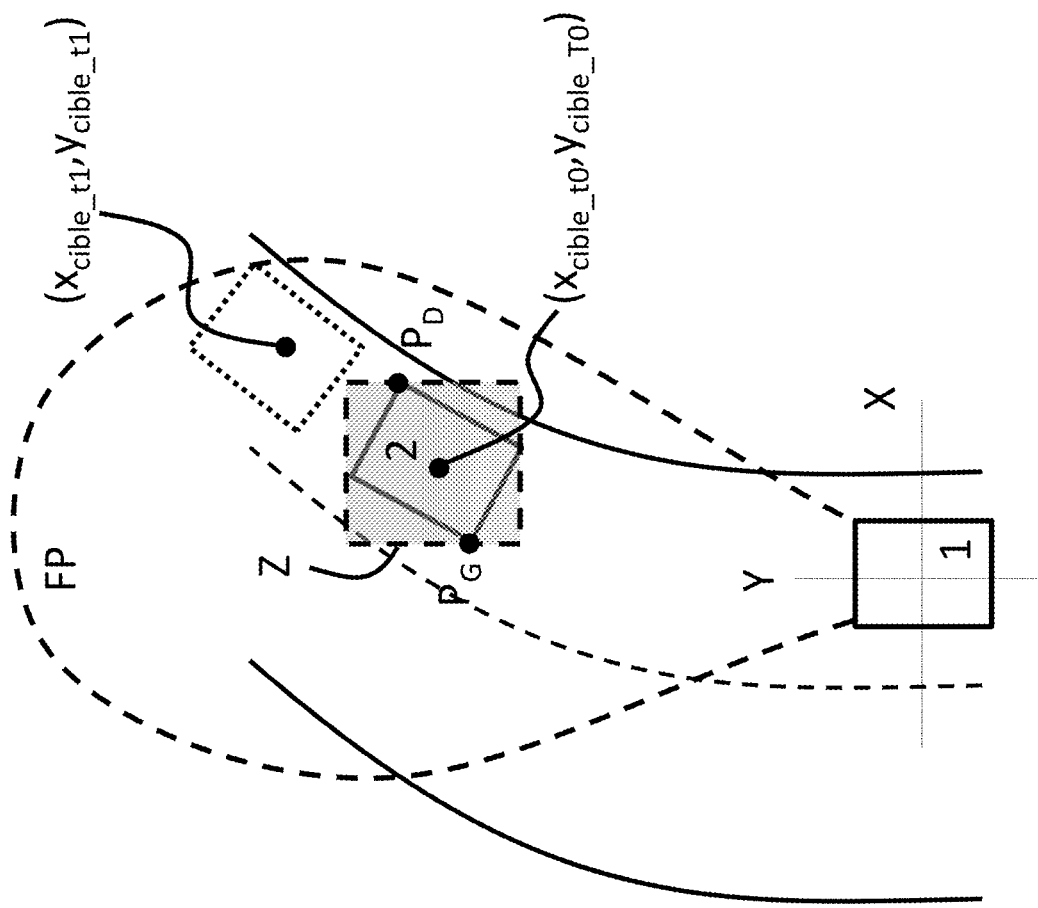

FIG. 1A schematically shows a view from above of a road scene in which a host vehicle 1 is following a target vehicle 2.

The host vehicle 1 is equipped with a lighting system comprising headlamps capable of emitting a pixelated road-illuminating beam FP, a control unit capable of switching on and/or switching off and/or modifying the light intensity of each of the pixels of the beam, and a sensor system for detecting a target object on the road to which glare is not to be caused and for measuring the position of this object.

In order to optimally illuminate the road and without causing glare to other road users, the lighting system implements the known method shown in FIG. 1B.

Step A1 corresponds to a step of acquiring, using the sensor system, an image of the road scene at a time $t_0$, and step A2 corresponds to a step of detecting the target vehicle 2 in this road scene. In step A3, the position ($X_{cible}$, $Y_{cible}$) of target vehicle 2 at time $t_0$ is computed and, subsequently, in step A4, positions $P_G$ and $P_D$ corresponding to the positions of the left and right edges of the target vehicle 2 at the time t0 are determined. These positions of the left and right edges are then delivered, in a step A5, to the control unit, which switches on and off the pixels of the illuminating beam so as to generate, in the beam between these two positions $P_G$ and $P_D$, a region Z that does not cause glare. It may easily be seen, from FIG. 1A, that these positions $P_G$ and $P_D$ were determined in light of the image of the road scene such as it was acquired at time to. However, steps A2 to A5 together require a non-negligible computing time, of about 150 ms, this generating a latency between the acquisition time t0 and the time t1 at which the region Z that does not cause glare is generated.

Now, in the case where the target vehicle 2 is moving at a very high rate, as in the case of FIG. 1a where the road possesses a high radius of curvature, the position ($X_{cible\_t1}$, $Y_{cible\_t1}$) of the target vehicle 2 at the time t1 is sufficiently far from its position ($X_{cible\_t0}$, $Y_{cible\_t0}$) at the time t0 that the region Z that does not cause glare is no longer centered on the target vehicle 2 at the time t1. The illuminating beam FP therefore causes glare to the target vehicle 2 at the time t1, despite the presence of the region Z that does not cause glare.

Figure 2B:
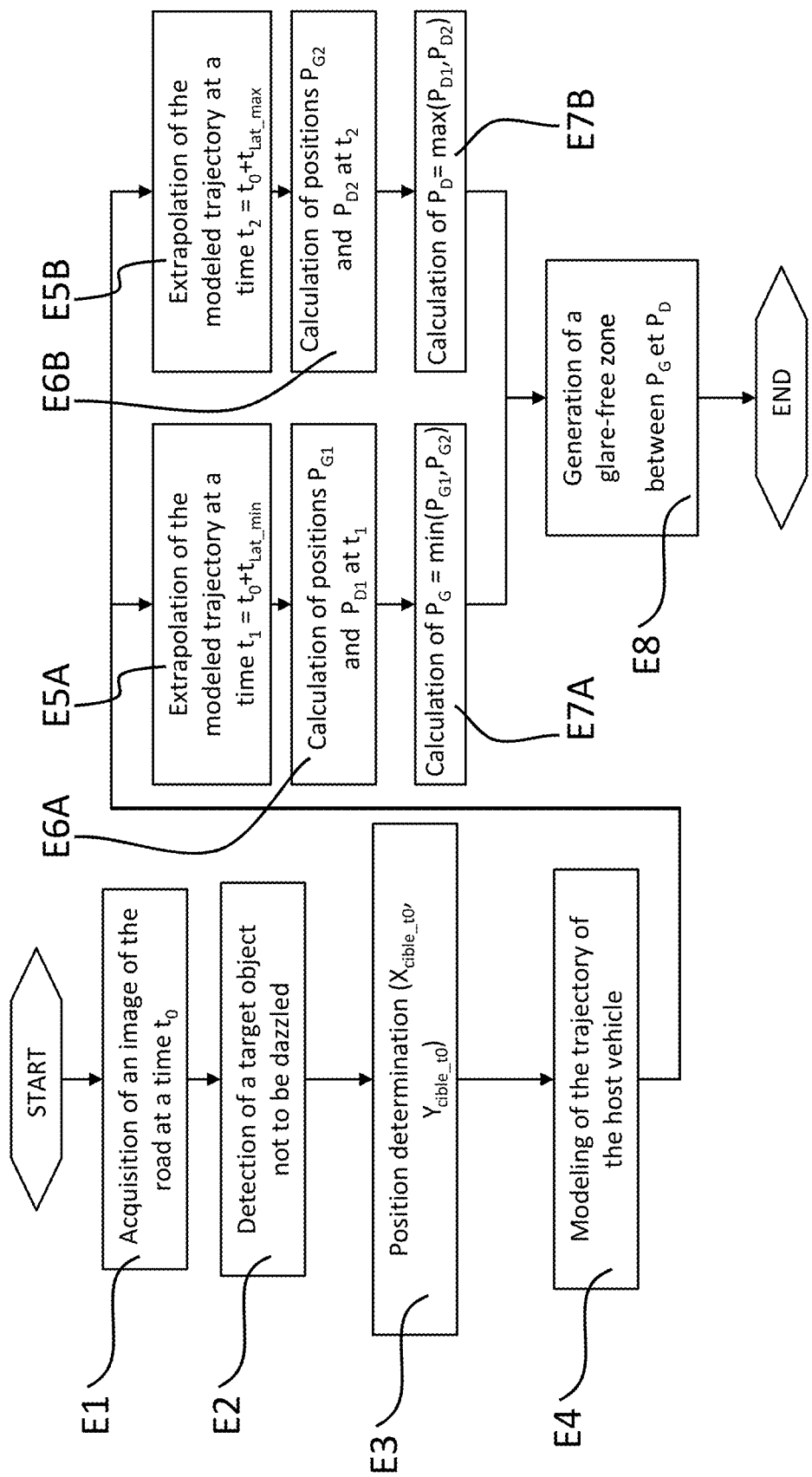

Thus, FIG. 2A schematically shows a view from above of a road scene in which a host vehicle 1 is following a target vehicle 2, the host vehicle being equipped with a lighting system according to the invention and implementing a method, as shown in FIG. 2B, for emitting a road-illuminating beam that illuminates the road but does not cause glare to the vehicle 2, according to the invention.

To this end, the host vehicle 1 comprises a lighting system 11 comprising a sensor system that is able to acquire the position of the target vehicle 2 on the road at a given time t0. It is for example a question of a camera that films the road scene in an acquiring step E1, and that is associated with a unit for processing the images delivered thereby with a view to detecting the presence of the target vehicle 2 in a detecting step E2, and to estimating the position ($X_{cible\_t0}$, $Y_{cible\_t0}$) thereof at a given time t0 in an acquiring step E3.

For example, the processing unit may implement, in step E2, methods for detecting the outline of the target vehicle, and, in step E3, methods for determining the centroid of this outline. As a variant, the processing unit may implement, in step E2, methods for detecting light sources belonging to the target vehicle, and, in step E3, methods for determining the centroid of the position of these light sources. In these two methods, the position of the centroid is considered to be the position ($X_{cible\_t0}$, $Y_{cible\_t0}$) of the target vehicle at the given time t0.

The lighting system 11 is also provided with a predicting unit that is able to predict the position of the target vehicle 2 on the road at a future time.

In order to predict the position of the target vehicle 2, the predicting unit is able to model, in a modeling step E4, a path TP of the host vehicle 1.

Specifically, the target vehicle 2 moves over the road in the same way as the host vehicle 1. Therefore, the target vehicle 2 was, a few moments before the time t0, in the same position as the host vehicle 1. It will therefore be understood that the path of the host vehicle 1 should result in the latter ending up, at a later time, in the position of the target vehicle 2. Therefore, modeling the path TP of the host vehicle 1 allows the path of the target vehicle 2 to be modeled, so as to be able to predict its position at a future time t1 or t2.

One method for modeling the path TP according to the invention will be detailed below with reference to FIG. 3. This path TP is, in the described example, modeled by an equation of the type y=f(x), where x is a coordinate along a steering X-axis of the host vehicle and y is a coordinate along a Y-axis normal to the X-axis.

Moreover, the predicting unit is able to extrapolate, in an extrapolating step E5, the modeled path TP to one or more future times in order to obtain the predicted position of the target vehicle 2 at this future time. This type of extrapolation may for example consist of an extension of the modeled path beyond the position of the target vehicle 2 at the acquisition time t0 to obtain its position at said future time. For example, the position of the target vehicle 2 along the X-axis at said future time may be estimated using its position and its speed at the acquisition time t0 (this speed may for example be obtained by differentiating the positions of the target vehicle 2 that are successively acquired by the acquiring unit). This position along the X-axis may thus be obtained via the equation: $x_{cible\_futur} = x_{cible} + V_{cible} t_{futur}$. This position along the X-axis then allows the position along the Y-axis of the target vehicle 2 to be obtained, using the equation modeling the path TP.

In the method presented in FIG. 2B, the predicting unit extrapolates, in a step E5A, the modeled path TP up to a first future time t1, which corresponds to the minimum latency of the steps described in FIG. 2B, i.e. the acquiring steps E1, E2 and E3, predicting steps E4 and E5 and correcting steps E6 and E7, to obtain the predicted position ($X_{cible\_t1}$, $Y_{cible\_t1}$) of the target vehicle at this future time t1.

Furthermore, the predicting unit replaces, in a correcting step E6A, the acquired position ($X_{cible\_t0}$, $Y_{cible\_t0}$) with a pair of positions $P_{G1}$ and $P_{D1}$, which correspond to the positions of the left and right edges of target vehicle 2 (as seen from the host vehicle 1) in the predicted position ($X_{cible\_t1}$, $Y_{cible\_t1}$).

These positions of the left and right edges are obtained in this example using the size of the target vehicle 2, which will have been estimated beforehand in step E2 (via the detection of the outline or of the light sources of the target vehicle 2), and using the yaw of this target vehicle 2, this yaw being for example obtained via the following equation:

$$\text{lacet} = a\tan\left(\frac{V_Y}{V_X + V_{hôte}}\right),$$

where $V_X$ and $V_Y$ are the speeds of the target vehicle 2 along the X- and Y-axes, and $V_{hôte}$ is the speed of the host vehicle 1, this speed for example being obtained by means of a navigation system of the host vehicle.

The predicting unit extrapolates, in a step E5B, the modeled path TP up to a second future time t2, which corresponds to the maximum latency of these same steps E1 to E7, to obtain the predicted position ($X_{cible\_t2}$, $Y_{cible\_t2}$) of the target vehicle at this future time t2. The predicting unit also replaces, in a correcting step E6B, the acquired position ($X_{cible\_t0}$, $Y_{cible\_t0}$) with a pair of positions $P_{G2}$ and $P_{D2}$, which correspond to the positions of the left and right edges of the target vehicle 2 in the predicted position ($X_{cible\_t2}$, $Y_{cible\_t2}$).

Since the latency of the system is not a constant value, two pairs of positions corresponding to the minimum and maximum positions at which the target vehicle 2 will possibly be found are thus obtained.

In order to guarantee that the illuminating beam FP is emitted with a region Z that does not cause glare to the target vehicle 2, whatever the latency of the lighting system at the time t0, the predicting unit then computes, in a correcting step E7A, the leftmost position $P_G$ between the positions of the left edges $P_{G1}$ and $P_{G2}$: $\min(P_{G1}, P_{G2})$, and, in a correcting step E7B, the rightmost position $P_D$ between the positions of the right edges $P_{D1}$ and $P_{D2}$: $\max(P_{D1}, P_{D2})$. It will therefore be understood that a region is obtained that is bounded on the right and left by extreme positions that the target vehicle 2 may take, depending on the variance of the latency of the lighting system.

In another embodiment (not shown), the predicting unit could solely extrapolate the modeled path TP up to a single future time, corresponding to the average latency of the lighting system, to obtain the predicted position of the target vehicle at this future time, and replace this position with a pair of positions corresponding to the positions of the left and right edges of the target vehicle in this predicted position.

Finally, the lighting system 11 is also provided with a lighting device able to emit the pixelated road-illuminating beam FP and to generate a region Z that does not cause glare in this beam depending on the corrected position of the target object, namely on the pair of positions $P_G$ and $P_D$. For this purpose the lighting device comprises one or more luminous modules that are arranged to emit said pixelated beam, and a control unit capable of switching on and/or switching off and/or modifying the light intensity of each of the pixels of the pixelated beam.

In a generating step E8, the control unit of the lighting device switches off a plurality of pixels of the pixelated beam FP in order to generate the region Z that does not cause glare between the positions $P_G$ and $P_D$. This generating step E8 is implemented at a time that is subsequent to the acquisition time t0, and that corresponds to this time to shifted by the latency of the lighting system 11.

Thus, thanks to the lighting system 11 and to the method according to the embodiment shown, the region Z that does not cause glare in the road-illuminating beam FP is thus positioned not in the position ($X_{cible\_t0}$, $Y_{cible\_t0}$) determined at the acquisition time of the image of the road, but rather in a position that has been corrected depending on a prediction of its position at a subsequent time, corresponding to the time at which said road-illuminating beam FP is emitted with the region Z that does not cause glare.

Figure 3:
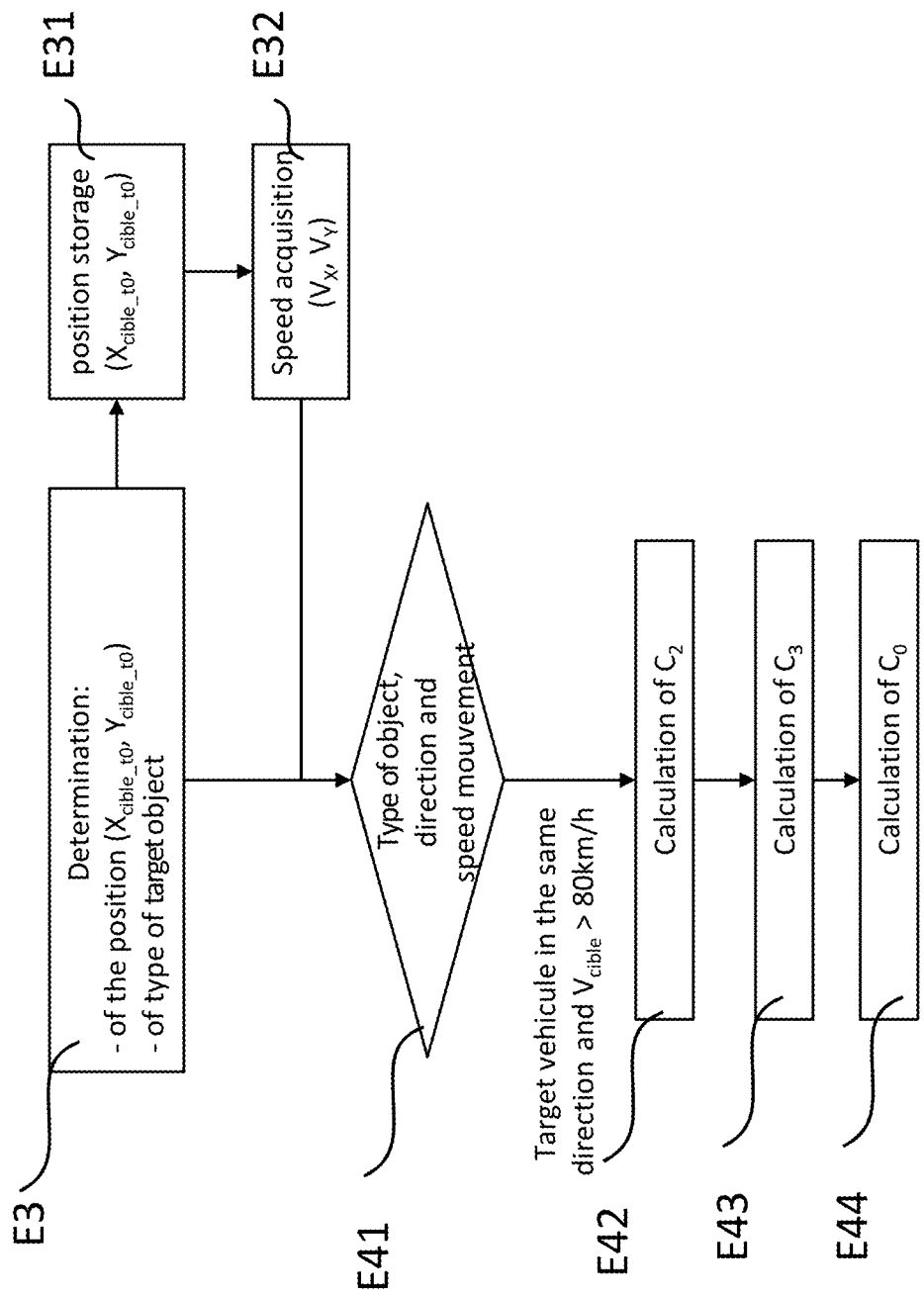
FIG. 3 shows one example of a method for predicting a path of the method described in FIG. 2B.

FIG. 3 shows an example of a method for modeling the path TP of the host vehicle 2, which method is implemented by the predicting unit of the lighting system 11 of FIG. 2A. In this example, the path is modeled that allows the host vehicle 1 to move from its position ($X_{hôte}$, $Y_{hôte}$) to the position of target vehicle 2 at time t0: ($X_{cible\_t0}$, $Y_{cible\_t0}$). To this end, it is necessary for the processing unit of the sensor system to determine, during step E3, in addition to the position ($X_{cible\_t0}$, $Y_{cible\_t0}$) the type of the target object 2. It is a question of determining the category of object likely to be present on the road, namely a pedestrian, a bicycle or a motor vehicle, to which the target object 2 belongs. The type of target object 2 is in the present case to be determined by comparing the outline of the target object 2 to a family of predetermined outlines corresponding to object categories.

It will also be noted that the processing unit implements a step E31 of storing the successively acquired positions ($X_{cible\_t0}$, $Y_{cible\_t0}$) and a step E32 for differentiating these acquired positions in order to obtain the speeds ($V_X$, $V_Y$) of the target object. These speeds especially allow whether the target object 2 is traveling in the same direction or in a direction opposite to the direction of travel of the host vehicle 1 to be identified.

In the step E4 of modeling the path TP, it is sought to define a polynomial y=f(x), x being a coordinate of the host vehicle 1 traveling on the path TP along a steering X-axis of the host vehicle and y being a coordinate of the host vehicle 1 traveling on the path TP along a Y-axis normal to the X-axis. In the present case, the polynomial is a third-degree polynomial the coefficients of which are $c_0$, $c_1$, $c_2$ and $c_3$.

In order to facilitate the computation of these coefficients, the model checks, in a step E41, whether the target object 2 is a motor vehicle traveling in the same direction as the host vehicle 1 and at a speed $V_{cible}$ higher than a threshold speed, 80 km/h in the present case.

If these conditions are met, the predicting unit implements a first step E42 of determining the coefficient of the term of degree 2 $C_2$. This coefficient is for example determined by means of the angle $\theta_{volant}$ of the steering wheel of the host vehicle 1 at the acquisition time t0, of the gear ratio factor of the steering of the host vehicle 1 and of the wheelbase E of the host vehicle, via the equation:

$$c_2 = \frac{\text{factor} \times \theta_{volant}}{2 \times E}.$$

As a variant, in the case where the host vehicle is provided with a navigation unit capable of determining the speed $V_{hôte}$ and the yaw $\dot{\theta}_{hôte}$ of the host vehicle, the coefficient of the term of degree 2 may be computed by means of the following equation:

$$c_2 = \frac{\dot{\theta}_{hôte}}{2 \times y_{hôte}}.$$

The predicting unit then implements a second step E43 of determining the coefficient of the term of degree 3. This coefficient is for example computed depending on the position of the target vehicle 2, on its yaw and on the coefficient of the term of degree 2, by means of the following equation:

$$c_3 = \frac{a\tan(\text{lacet}) - 2c_2 x_{cible}}{3x_{cible}^2}.$$

Lastly, the predicting unit implements a third step E44 of determining the coefficient of the term of degree 0. This coefficient is for example computed depending on the position of the target vehicle 2 and on the coefficients of the terms of degree 2 and 3, by means of the following equation:

$$c_0 = y_{cible} - c_2 x_{cible}^2 - c_3 x_{cible}^3.$$

At the end of step 44, the coefficient of the term of degree 1 being zero (the host vehicle 1 being assumed to be moving collinearly to the road), an equation modeling the path TP of the host vehicle 1 between its position ($X_{hôte}$, $Y_{hôte}$) and the position ($X_{cible\_t0}$, $Y_{cible\_t0}$) of target vehicle 2 at time t0 is thus obtained: $y = c_0 + c_2 x^2 + c_3 x^3$.

FIG. 4 shows a lighting system 100 of a motor vehicle according to one embodiment of the invention.

The lighting system 100 comprises a sensor system 200, which for example comprises a camera 210 aimed at the road on which the motor vehicle is being driven, in order to implement step E1 of FIG. 2B; and a processing unit 220, which is for example integrated into a microcontroller, and which receives the images from the camera 210 in order to implement steps E2 and E3 of FIG. 2B and thus detect and acquire the position of a target object on the road to a given time.

The lighting system 100 also comprises a predicting unit 300, which is for example integrated into the same microcontroller as the processing unit 220 or, as a variant, integrated in another microcontroller, and which receives, from the processing unit 220, the position of the target vehicle at the given time, and implements steps E4, E5A, E5B, E6A, E6B, E7A and E7B of FIG. 2B, in order thus to predict the position of the target object on the road at a future time and to correct the acquired position depending on the predicted position.

The lighting system 100 furthermore comprises a lighting device 400 comprising first and second luminous modules 2 and 3 that are each able to project one pixelated beam, these two beams together forming the pixelated road-illuminating beam FP.

Each module comprises:
- a pixelated light source 21, 31 comprising 900 elementary emitters that are arranged in a matrix array of 20 rows by 45 columns, each of the elementary emitters being able to be activated selectively so as to emit one elementary light beam; and
- a projecting optical element 22, 32 that is associated with said light source with a view to projecting each of said elementary light beams in the form of a pixel having a width and a length of 0.3°.

In the described embodiment, the light source 21 comprises a monolithic matrix array of electroluminescent elements, such as described above.

Provision may be made to replace the light source 21 with any other type of pixelated light source described above, such as for example a matrix array of light-emitting diodes or a light source associated with a matrix array of optoelectronic elements, such as micromirrors.

Each luminous module 2 and 3 may comprise elements other than those described above. These elements will not be described in the context of the present invention since they do not interact functionally with the arrangements according to the invention.

Lastly, the lighting device 400 comprises a control unit 4 that is able to selectively control, depending on control instructions that it receives, the light intensity of each of the pixels of the pixelated beams emitted by the modules 2 and 3, for example by selectively switching on and off the elementary emitters of the light sources 21 and 31, or else by increasing or decreasing the electrical power supplied to each of these elementary emitters. The control unit 4, which is for example integrated into a microcontroller, receives, from the predicting unit 300, the position predicted for the future time and implements step E8 of FIG. 2B to generate a region that does not cause glare in the pixelated light beam depending on the corrected target-object position.

The above description clearly explains how the invention allows the objectives that were set therefor to be achieved, and especially how it provides a solution allowing a solution to be provided that allows, in an illuminating beam, a region to be generated that does not cause glare to a target object to which glare is not to be caused, when the target object is moving at a high rate. The method and the lighting system according to the invention allow, in the road-illuminating beam, the region that does not cause glare to be generated not in the target-object position determined at the acquisition time of the image of the road, but rather in a position that has been corrected depending on a prediction of its position at a subsequent time, corresponding to the time at which said road-illuminating beam is emitted with the region that does not cause glare.

The invention is not limited to the embodiments specifically given in this document by way of nonlimiting examples, and extends in particular to all equivalent means and to any technically workable combination of these means. Thus, the features, variants and various embodiments of the invention may be combined with one another, in various combinations, provided that they are not mutually incompatible or exclusive.

The invention claimed is:

1. A method for commanding a lighting device of a host motor vehicle to emit a road-illuminating beam that illuminates the road while minimizing glare to a target object on the road, the method comprising the following steps:

acquiring, by means of a sensor system of the host motor vehicle, an acquired position (xcible_t0, ycible_t0) of the target object on the route at a given time (t0);

determining that the target object is a motor vehicle traveling on a same route and in a same direction as the host motor vehicle which is following behind the target object on the route, and that the target object is traveling at a speed that is higher than a threshold speed;

dependent on completing the determining, predicting, by means of a predicting unit, a first predicted position (xcible_t1, ycible_t1), of the target object on the route at a future time (t1) that is in the future with respect to the given time (t0) and a second predicted position (xcible_t2, ycible_t2), of the target object on the route at another future time (t2) that is in the future with respect to both the given time (t0) and the future time (t1);

correcting, by means of the predicting unit, the target-object position acquired at the given time (t0) depending on the first predicted position at the future time (0) and the second predicted position at the future time (t2), wherein the future time (t1) of the predicting step is offset with respect to the given time (t0) of the acquiring step by a computed duration depending on a minimum latency of the acquiring, predicting, correcting and generating steps, the future time (t2) of the predicting step is offset with respect to the given time (t0) of the acquiring step by a computed duration depending on a maximum latency of the acquiring, predicting, correcting and generating steps; and generating, by means of the lighting device, in a beam for illuminating the road that said device emits, a region that minimizes glare, depending on the corrected position of the target object, and the region that minimizes glare is an enlarged region based on the minimum and maximum latency.

2. The method as claimed in claim 1, wherein the acquiring step comprises a first sub-step of detecting the target object, and a second sub-step of acquiring the position (xcible_t0, ycible_t0) and the type of the target object.

3. The method as claimed in claim 1, wherein the predicting step comprises a sub-step of modeling a path of the host vehicle.

4. The method as claimed in claim 3, wherein the path of the host vehicle is modeled from the position (xhôte, yhôte) at the given time (t0) of the acquiring step, to the position (xcible_t0, ycible_t0) of the target object acquired in said acquiring step.

5. The method as claimed in claim 4, wherein said path is modeled by a third-degree polynomial the coefficients (c0, c1,c2,c3) of which are determined depending on the curvature of the road, and on the speeds and positions of the host vehicle and target object.

6. The method as claimed in claim 5, wherein the coefficient of the term of degree 2 (c2) is computed depending on the curvature of the road and on the wheelbase of the host vehicle.

7. The method as claimed in claim 6, wherein the coefficient of the term of degree 1 (c1) is zero.

8. The method as claimed in claim 7, wherein the coefficient of the term of degree 3 (c3) is computed depending on a yaw and position (xcible_t0, ycible_t0) of the target object.

9. The method as claimed in claim 3, wherein the predicting step comprises a sub-step of extrapolating the modeled path up to the future time (t1) in order to obtain the predicted target-object position (xcible_t1, ycible_t1) at this future time.

10. The method as claimed in claim 9, the correcting step comprising replacing the acquired position (xcible_t0, ycible_t0) with a pair of positions (PG, PD) corresponding to the positions of the left and right edges of the target object in the predicted position.

11. The method as claimed in claim 3, wherein the predicting step comprises a sub-step of extrapolating the modeled path up to the first future time (t1) and up to the second future time (t2), in order to obtain the first and second predicted positions (xcible_t1, ycible_t1), (xcible_t2, ycible_t2) of the target object at these future times.

12. The method as claimed in claim 11, wherein the correcting step comprises replacing the acquired position (xcible_t0, ycible_t0) with a pair of positions (PG, PD) in which:

one of the positions (PG) corresponds to the leftmost position of the positions (PG1, PG2) of the left edges in the first and second predicted positions (xcible_t1, ycible_t1), (xcible_t2, ycible_t2);

the other of the positions (PD) corresponds to the rightmost position of the positions (PD1, PD2) of the right edges in the first and second predicted positions.

13. The method as claimed in claim 1, wherein the road-illuminating beam emitted by the lighting device is a pixelated beam and wherein the step of generating a region that minimizes glare consists in switching on and/or switching off and/or modifying the intensity of a plurality of pixels of this pixelated beam depending on the corrected position (PG, PD).

14. A motor-vehicle lighting system, comprising:

a sensor system configured to acquire an acquired position (xcible_t0, ycible_t0) of a target object on the road at a given time (t0);

circuitry which determines that the target object is a motor vehicle traveling on a same route and in a same direction as the host motor vehicle which is following behind the target object on the route, and that the target object is traveling at a speed that is higher than a threshold speed;

a predicting unit which, dependent on the circuitry completing the determining, is configured to:
predict a first predicted position (xcible_t1, ycible_t1) of the target object on the road at a future time (t1) that is in the future with respect to the given time,
predict a second predicted position (xcible_t2, ycible_t2), of the target object on the route at another future time (t2) that is in the future with respect to both the given time (t0) and the future time (t1), and
correct the acquired target-object position acquired at the given time (t0) depending on the first predicted position at the future time (t1) and the second predicted position at the future time (t2), wherein the future time (t1) of the predicting step is offset with respect to the given time (t0) of the acquiring step by a computed duration depending on a minimum latency of the acquiring, predicting, correcting and generating steps, the future time (t2) of the predicting step is offset with respect to the given time (t0) of the acquiring step by a computed duration depending on a maximum latency of the acquiring, predicting, correcting and generating steps; and a lighting device configured to emit a road-illuminating beam and to generate, in this beam, a region that minimizes glare, depending on the corrected position of the target object, wherein the region that minimizes glare is an enlarged region based on the minimum and maximum latency.

15. A data-storage means which stores one or more programs the execution of which permits the method as claimed in claim 1 to be implemented.

16. A computer program on a data-storage means, comprising one or more sequences of instructions that are executable by a microprocessor and/or a computer, the execution of said sequences of instructions permitting the method as claimed in claim 1 to be implemented.

17. The method as claimed in claim 2, wherein the predicting step comprises a sub-step of modeling a path of the host vehicle.

* * * * *